US007133098B2

(12) United States Patent
Lin

(10) Patent No.: US 7,133,098 B2
(45) Date of Patent: Nov. 7, 2006

(54) LIQUID CRYSTAL DISPLAY INCLUDING ARRAY OF PROTRUSIONS IN A BROKEN ZIGZAG PATTERN ALL FORMED WITHIN AREA OF LIGHT-SHIELDING MATRIX

(75) Inventor: Bi Ly Lin, Tainan Science-Based Industrial Park (TW)

(73) Assignee: Chi Mei Optoelectronics Corp., Tainan County (TW)

( * ) Notice: Subject to any disclaimer, the term of this patent is extended or adjusted under 35 U.S.C. 154(b) by 0 days.

(21) Appl. No.: 10/270,496

(22) Filed: Oct. 16, 2002

(65) Prior Publication Data

US 2004/0075799 A1 Apr. 22, 2004

(51) Int. Cl.
G02F 1/1337 (2006.01)
(52) U.S. Cl. .................... 349/129; 349/128; 349/130
(58) Field of Classification Search ............... 349/128, 349/129, 130
See application file for complete search history.

(56) References Cited

U.S. PATENT DOCUMENTS

| 5,263,888 | A | 11/1993 | Ishihara et al. | |
|---|---|---|---|---|
| 6,121,632 | A | 9/2000 | Taguchi et al. | |
| 6,255,130 | B1 | 7/2001 | Kim | |
| 6,338,989 | B1 | 1/2002 | Ahn et al. | |
| 6,583,837 | B1* | 6/2003 | Fukumoto et al. | 349/129 |
| 6,724,452 | B1 | 4/2004 | Takeda et al. | |
| 6,888,602 | B1* | 5/2005 | Takeda et al. | 349/141 |
| 2001/0022643 | A1 | 9/2001 | Kim et al. | |
| 2002/0021402 | A1 | 2/2002 | Hirabayashl et al. | |
| 2002/0097364 | A1 | 7/2002 | Kwon et al. | |
| 2002/0142505 | A1 | 10/2002 | Hwang et al. | |
| 2003/0164916 | A1 | 9/2003 | Chien et al. | |
| 2003/0174269 | A1* | 9/2003 | Tanaka et al. | 349/129 |

FOREIGN PATENT DOCUMENTS

EP 0 884 626 12/1998
FR 2 803 680 7/2001

* cited by examiner

Primary Examiner—Tarifur R. Chowdhury
(74) Attorney, Agent, or Firm—Finnegan, Henderson, Farabow, Garrett & Dunner, L.L.P.

(57) ABSTRACT

A liquid crystal display mainly includes two substrates processed for vertical alignment and a liquid crystal having a negative dielectric constant anisotropy sealed between the two substrates. An array of slits is provided on pixel electrodes formed on one substrate. A light-shielding matrix and an array of protrusions is provided on the other substrate. Each of the first protrusions has a main body being arranged substantially in a zigzag pattern and in parallel to one another. The slits and the main bodies of the first protrusions are arranged alternately. The liquid crystal display is characterized in that the first protrusions have a plurality of breaks formed within the area of the light-shielding matrix.

15 Claims, 7 Drawing Sheets

LIQUID CRYSTAL DISPLAY INCLUDING ARRAY OF PROTRUSIONS IN A BROKEN ZIGZAG PATTERN ALL FORMED WITHIN AREA OF LIGHT-SHIELDING MATRIX

BACKGROUND OF THE INVENTION

1. Field of the Invention

The present invention generally relates to a liquid crystal display (LCD), and more particularly to a multi-domain vertically aligned (MVA) LCD having specific protrusion pattern for use in a one drop fill (ODF) process.

2. Description of the Related Art

Liquid crystal display mainly comprises two oppositely positioned first and second substrates and a liquid crystal layer interposed therebetween. U.S. Pat. No. 5,263,888 discloses a one drop fill (ODF) process comprising the steps of applying an adhesive onto the entire periphery of the first substrate, dropping the liquid crystal material to the first substrate, superposing the second substrate upon the first substrate and pressing the substrates until a gap between the substrates reaches a predetermined value (typically 3–10 micrometers), and curing the adhesive. In the step of pressing the substrates, the liquid crystal material spreads to fill the space between the substrates thereby forming the liquid crystal layer.

Vertically-aligned (VA) LCD is a mode using a negative liquid crystal material and vertical alignment films. Comparing with the twisted nematic (TN) LCD, the vertically-aligned (VA) LCD provides higher contrast, higher response speed, and excellent viewing angle characteristics for white display and black display. However, the VA LCD still has a critical drawback of a narrow viewing angle. This poses a problem that the application of the VA LCD is limited.

European Patent Publication Number 0884626-A2 discloses a multi-domain vertically aligned (MVA) LCD having domain regulating means for improving viewing angle performance thereof. Typically, the domain regulating means is realized by providing slits on the pixel electrodes of the TFT substrate and providing protrusions on the common electrode of the CF (color filter) substrate. The pattern of the protrusions is continuous and the protrusions are arranged in substantially the same way in all pixels. The protrusions typically have a height of around 1–2μ. For an MVA LCD with a smaller cell gap (3–3.9 μm) design, the spacing between the protrusions and the TFT substrate is about 2–2.9 μm. If the MVA LCD is manufactured by the aforementioned ODF process, bubble is prone to be entrapped between the protrusions in a continuous pattern. In such a case, it may be found that an insufficient degree of spreading of the liquid crystal material will occur during the step of pressing the substrates thereby creating bubbles between the protrusions.

SUMMARY OF THE INVENTION

It is an object of the present invention to provide a multi-domain vertically aligned (MVA) LCD having discontinuous regulating means that overcomes or at least reduces the above-mentioned problems of the prior art.

To achieve the above listed and other objects, the LCD according to the present invention comprises a first substrate and a second substrate processed for vertical alignment, a liquid crystal being sandwiched between the first and second substrates, and discontinuous regulating means provided on at least one of the first and second substrates. The liquid crystal layer includes liquid crystal molecules aligning in a direction generally perpendicular to a principal surface of said first substrate when no substantial electric field is applied to said liquid crystal layer. The discontinuous regulating means regulates orientation of the liquid crystal layer such that the liquid crystal molecules are aligned obliquely when a voltage is applied so that the orientation will include a plurality of directions within each pixel. Since the regulating means is formed in a discontinuous pattern, air trapped between the first and second substrates can be easily vented through the regulating means, thereby significantly reducing the occurring rate of bubbles.

According to one embodiment of the present invention, the discontinuous regulating means is realized by providing an array of first protrusions and slits wherein each of the first protrusions has a plurality of breaks formed therein. The first protrusions are formed on the second substrate wherein each of the first protrusions has a main body being arranged substantially in a zigzag pattern and in parallel to one another. The slits are provided on the pixel electrodes provided on the first substrate in a manner that the slits and the main bodies of the first protrusions are arranged alternately. The breaks of the first protrusions allow air trapped between the first protrusions to be easily vented therethrough, thereby significantly reducing the occurring rate of bubbles. Furthermore, during the step of pressing the substrates in the ODF process, the breaks of the first protrusions allows the dropped liquid crystal material to be spread more evenly such that the liquid crystal material will completely fill the cavity formed between the two substrates. However, since the pattern of the first protrusions is discontinuous, the orientation of the liquid crystal molecules is disordered at the edges of the breaks. This results in disclination generating around the edges of the breaks. Therefore, all of the breaks may be designed to have a predetermined size in order to achieve good air ventilation while minimizing disclination. Alternatively, all of the breaks may be formed within the area of the light-shielding matrix formed on the second substrate thereby significantly masking the deteriorated display quality such as light leakage due to disclination.

Typically, the second substrate may have a plurality of gate lines formed parallel to one another and a plurality of data lines formed parallel to one another vertically to the gate lines. The pixel electrodes have first edges parallel to the gate lines and second edges parallel to the data lines. The light-shielding matrix has a plurality of columns extending along the data lines and a plurality of rows extending along the gate lines. Therefore, all of the breaks may be designed to be located within the area of the rows and/or the columns of the light-shielding matrix such that none of the first protrusions extends across the rows and/or the columns of the light-shielding matrix.

Preferably, the first protrusions may have a plurality of first branches formed at positions facing the first edges of the pixel electrodes and a plurality of second branches formed at positions facing the second edges of the pixel electrodes. In this embodiment, the difference between the directors (i.e., the average direction of the long axes of the LC molecules) of the LC molecules around the branches and slits is significantly reduced down to at most 45 degrees. This significantly suppresses disclination occurring at the border between the slits and the pixel electrode edges, thereby avoiding display defects due to the disclination.

According to another embodiment of the present invention, the second substrate further comprises a plurality of second protrusions formed inside one channel defined by two first branches extending from the main bodies of adjacent first protrusions and the first and second substrates.

According to still another embodiment of the present invention, the second substrate further comprises a plurality of third protrusions each formed at a location close to one channel defined by two first branches extending from the main bodies of adjacent first protrusions and the first and second substrates.

BRIEF DESCRIPTION OF THE DRAWINGS

Other objects, advantages, and novel features of the invention will become more apparent from the following detailed description when taken in conjunction with the accompanying drawings.

DETAILED DESCRIPTION OF THE PREFERRED EMBODIMENT

The present invention provides a multi-domain vertically aligned (MVA) LCD having discontinuous regulating means for use in liquid crystal injecting process such as one drop fill (ODF) process. The LCD according to the present invention comprises a first substrate and a second substrate processed for vertical alignment and a liquid crystal being sandwiched between the first and second substrates. The discontinuous regulating means is provided on at least one of the first and second substrates. The liquid crystal layer includes liquid crystal molecules aligning in a direction generally perpendicular to a principal surface of said first substrate when no substantial electric field is applied to said liquid crystal layer. The discontinuous regulating means regulates orientation of the liquid crystal layer such that the liquid crystal molecules are aligned obliquely when a voltage is applied so that the orientation will include a plurality of directions within each pixel thereby improving viewing angle performance. Since the regulating means is formed in a discontinuous pattern, air trapped between the first and second substrates can be easily vented through the regulating means, thereby significantly reducing the occurring rate of bubbles.

Figure 6:
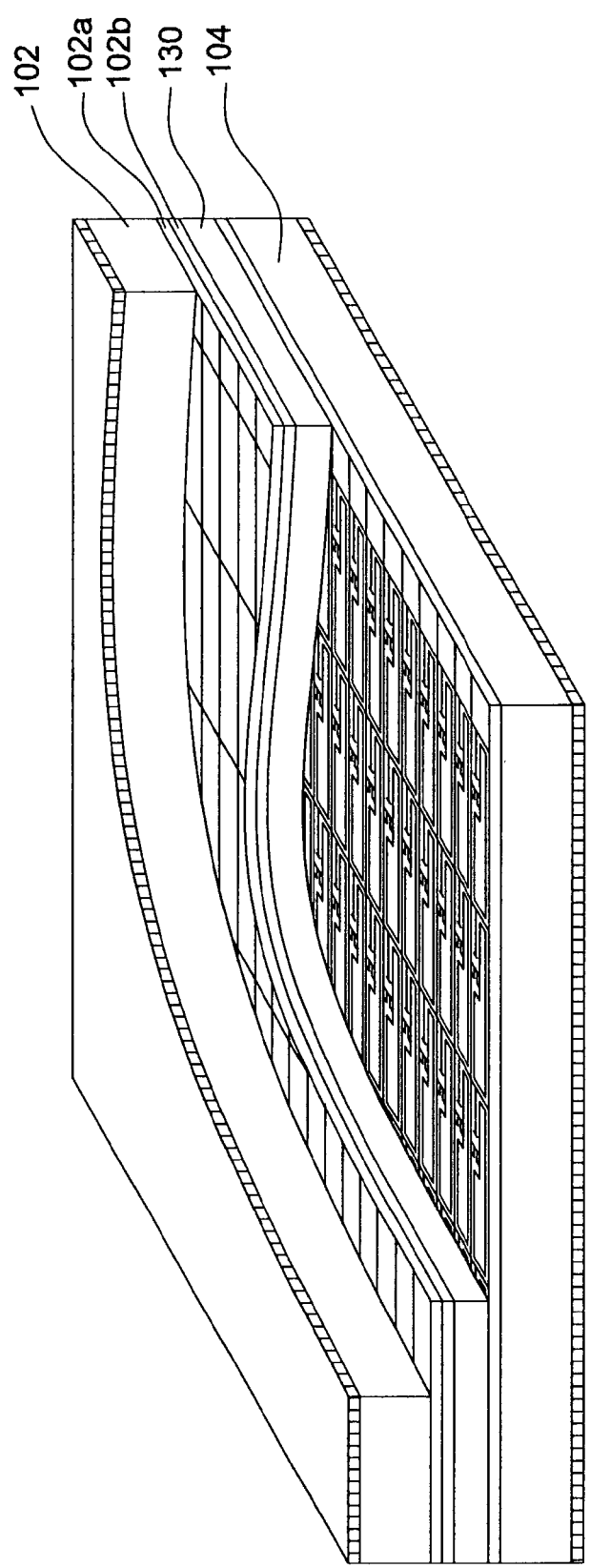
FIG. 6 is a partial cutaway view of a vertically-aligned (VA) LCD according to one embodiment of the present invention.

As shown in FIG. 6, the LCD mainly comprises a first substrate 102 and a second substrate 104. The surfaces of the substrates are processed for vertical alignment. A liquid crystal 130 having a negative dielectric constant anisotropy is sealed between the two substrates. The MVA LCD of the present invention is preferably a thin-film transistor LCD.

Typically, the first substrate 102 is referred to as a color filter (CF) substrate because color filters 102a are formed, while the second substrate 104 is referred to as a TFT substrate. Usually, spacers (not shown) are formed between the substrates for defining a cell gap between the substrates.

Figure 1A:
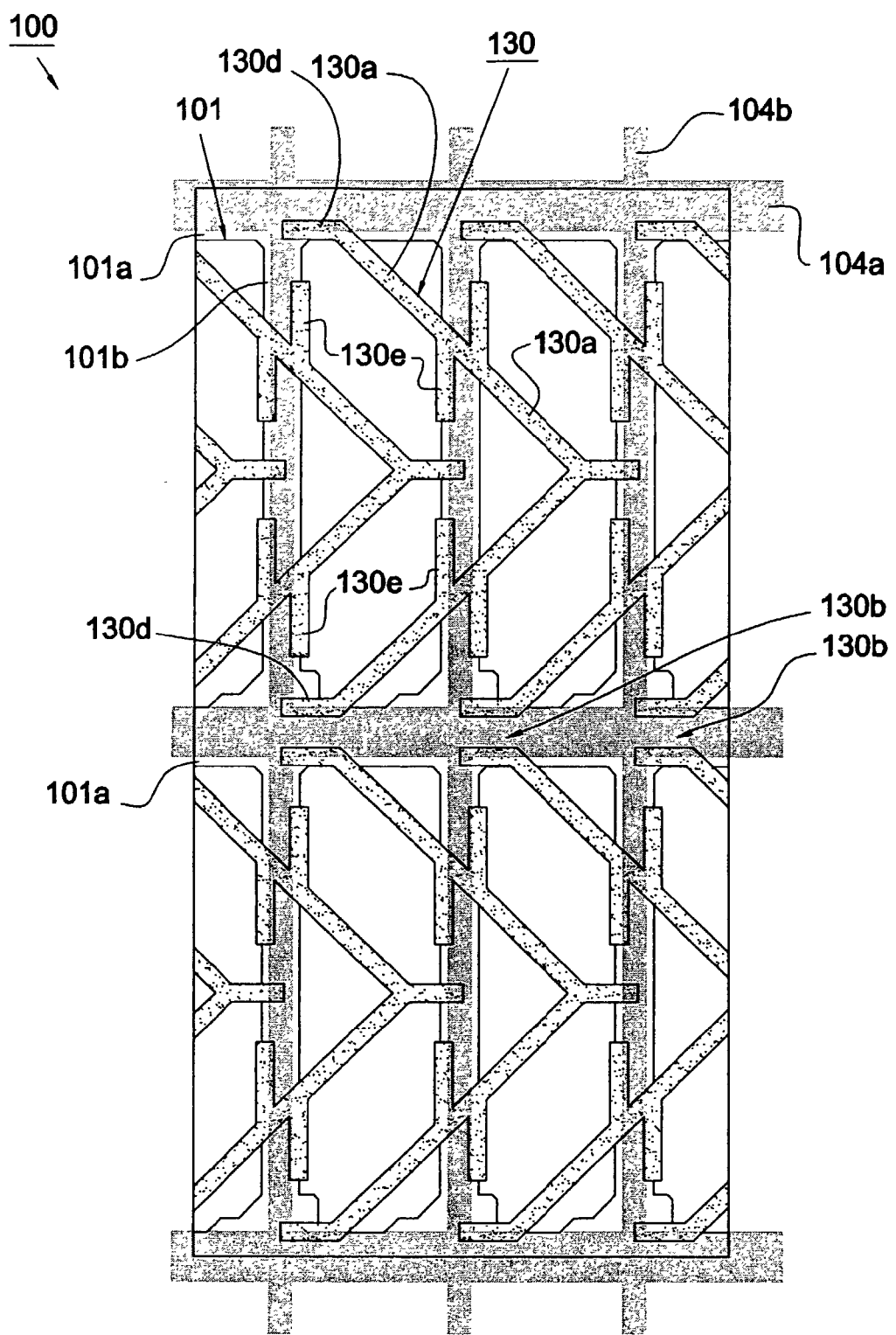
FIG. 1a is a plan view of a portion of an MVA LCD showing specific protrusion pattern according to a first embodiment of the present invention.
Figure 1B:
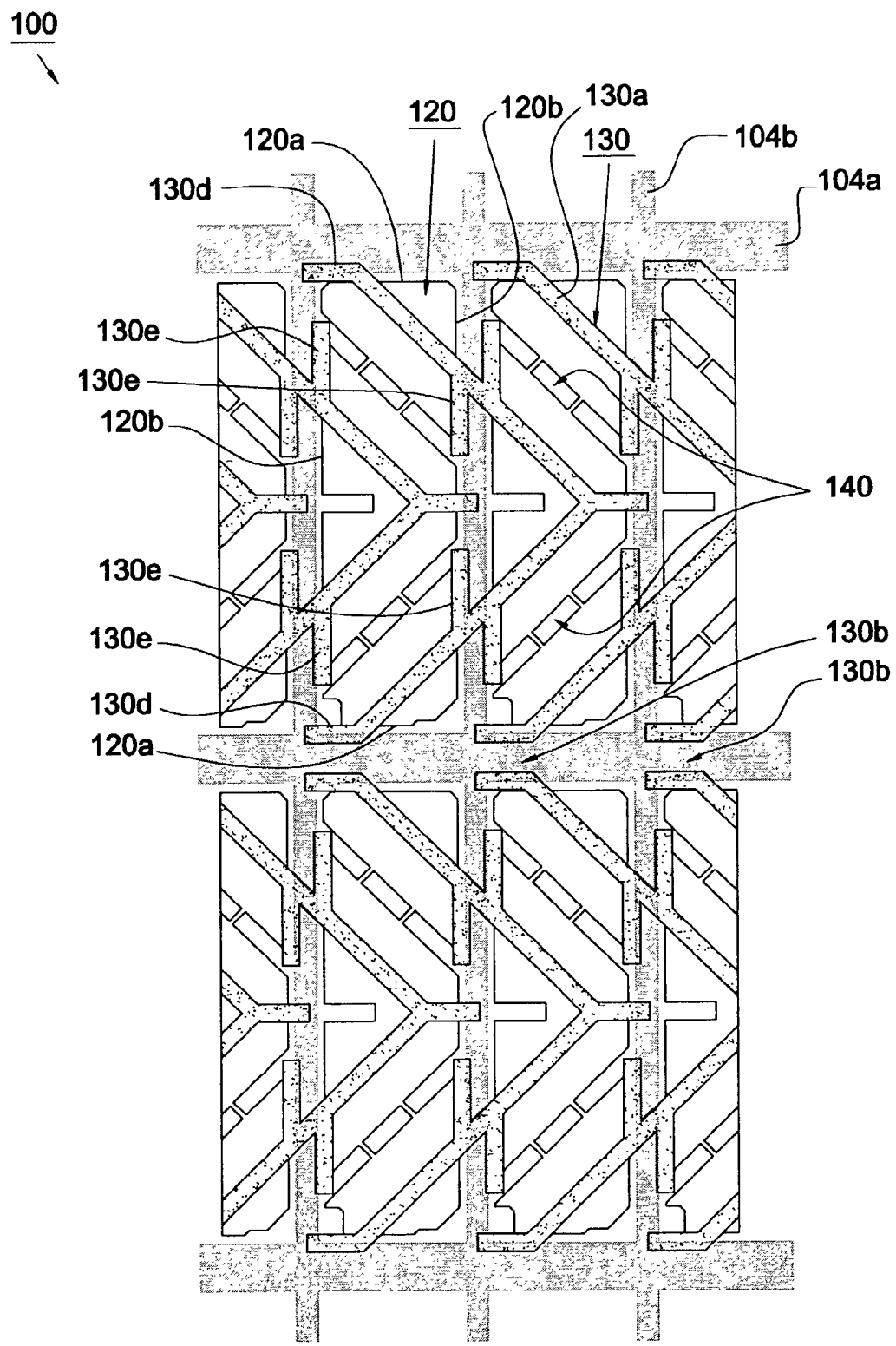
FIG. 1b is a plan view of the MVA LCD of FIG. 1a showing specific protrusion and slit pattern.

FIGS. 1a and 1b show a portion of an MVA LCD 100 with discontinuous regulating means realized by providing specific protrusion and slit pattern according to a first embodiment of the present invention. The first substrate 102 has a light-shielding matrix 101 (not shown in FIG. 1b), for example a black matrix, formed thereon. The second substrate 104 is provided with a plurality of parallel gate lines 104a, a plurality of parallel data lines 104b perpendicular to the gate lines 104a, and a plurality of thin film transistors (TFTs) and pixel electrodes 120 (not shown in FIG. 1a) formed like a matrix at the intersections between the gate lines 104a and data lines 104b. The pixel electrode 120 has first edges 120a parallel to the gate lines 104a and second edges 120b parallel to the data lines 104b. The LCD 100 is formed with a plurality of protrusions 130 and slits 140 (not shown in FIG. 1a) for regulating the orientation of the liquid crystal such that the alignment of liquid crystal molecules is induced by application of a voltage to include a plurality of directions. By virtue of orientating the liquid crystal molecules into a plurality of mutually different directions, the viewing angle the LCD 100 can be greatly increased. The protrusions 130 are arranged in parallel to one another on the first substrate. Each protrusion 130 has a main body 130a being bent substantially in a zigzag pattern. The slits 140 are provided on the pixel electrodes 120. As shown in FIG. 1b, the slits 140 and the main bodies 130a of the protrusions are arranged alternately.

The protrusions 130 of the MVA LCD 100 have a plurality of breaks 130b such that air trapped between the protrusions 130 can be easily vented through the breaks 130b, thereby significantly reducing the occurring rate of bubbles. Furthermore, during the step of pressing the substrates in the ODF process, the breaks 130b of the protrusions 130 allows the dropped liquid crystal material to be spread more evenly such that the liquid crystal material will completely fill the cavity formed between the two substrates. However, since the pattern of the protrusions 130 is discontinuous, the tilting direction of the liquid crystal molecules due to the protrusions 130 becomes disordered at the edges of the breaks 130b. This results in disclination generating around the edges of the breaks 130b. Therefore, all of the breaks 130b may be designed to have a predetermined size in order to achieve good air ventilation while minimizing disclination. Alternatively, all of the breaks 130b may be formed within the area of the light-shielding matrix 101 thereby significantly masking the deteriorated display quality such as light leakage due to disclination.

Figure 5:
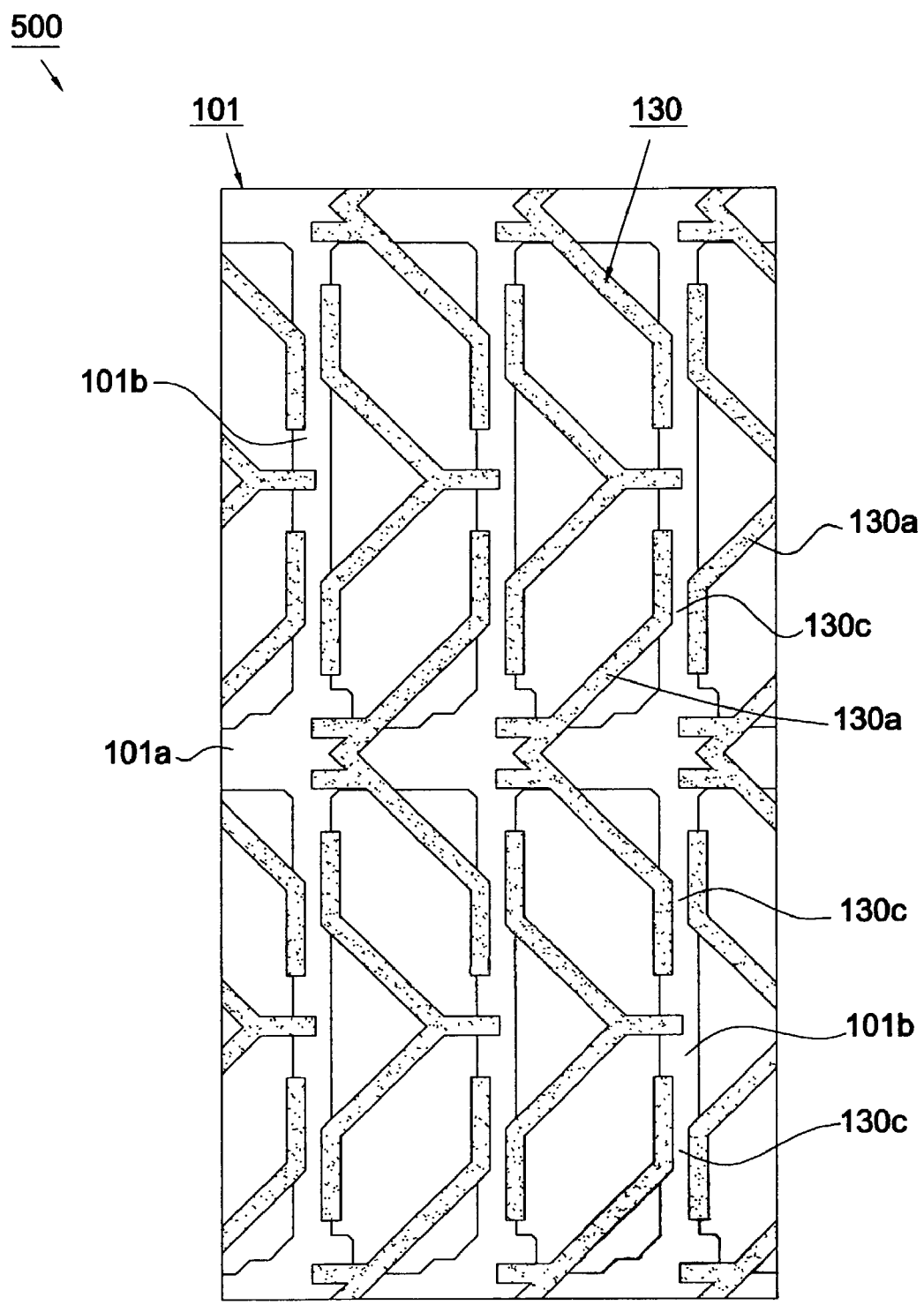
FIG. 5 is a plan view of a portion of an MVA LCD showing specific protrusion pattern according to a fifth embodiment of the present invention.

As shown in FIG. 1a, the light-shielding matrix 101 has a plurality of rows 101a extending along the gate lines 104a and a plurality of columns 101b extending along the data lines 104b. All of the breaks 130b are designed to be located within the area of the rows 111a of the light-shielding matrix such that none of the protrusions 130 extends across the rows 101a. Alternatively, the protrusions of the present invention may have breaks 130c (see FIG. 5) all located within the area of the columns 101b of the light-shielding matrix such that none of the protrusions extends across the columns 101b of the light-shielding matrix. All of the breaks may be designed to be located within the area of the rows and the columns of the light-shielding matrix such that none of the protrusions extends across the rows and the columns of the light-shielding matrix.

Generally speaking, when the liquid crystal display is only provided with the slits 140 and the main bodies 130a of the protrusions bent in zigzag, some particular area within the pixel appear darkened. The change of the orientation of the liquid crystal in the darkening area turns to become slow in response to the voltage applied. This reduces the contrast and the response speed, thereby deteriorating the display quality. This is due to the fact that the inclination of liquid crystal molecules influenced by the electric field near the edges 120a, 120b of the pixel electrode 120 (see FIG. 1b) is considerably different from that caused by the slits 140 in the darkening area. Therefore, as shown in FIG. 1b, the protrusions 130 preferably have a plurality of first branches 130d formed at positions facing the first edges 120a of the pixel electrodes 120 and a plurality of second branches 130e formed at positions facing the second edges 120b of the pixel electrodes 120. In this embodiment, the difference between the directors (i.e., the average direction of the long axes of the liquid crystal molecules) of the liquid crystal molecules around the branches 130d, 130c and the slits 140 is significantly reduced down to at most 45 degrees. This significantly suppresses disclination occurring at the border between the domain formed by the edges of the pixel electrode 120 and the domain formed by the slits 140, thereby avoiding display defects due to the disclination.

Figure 2:
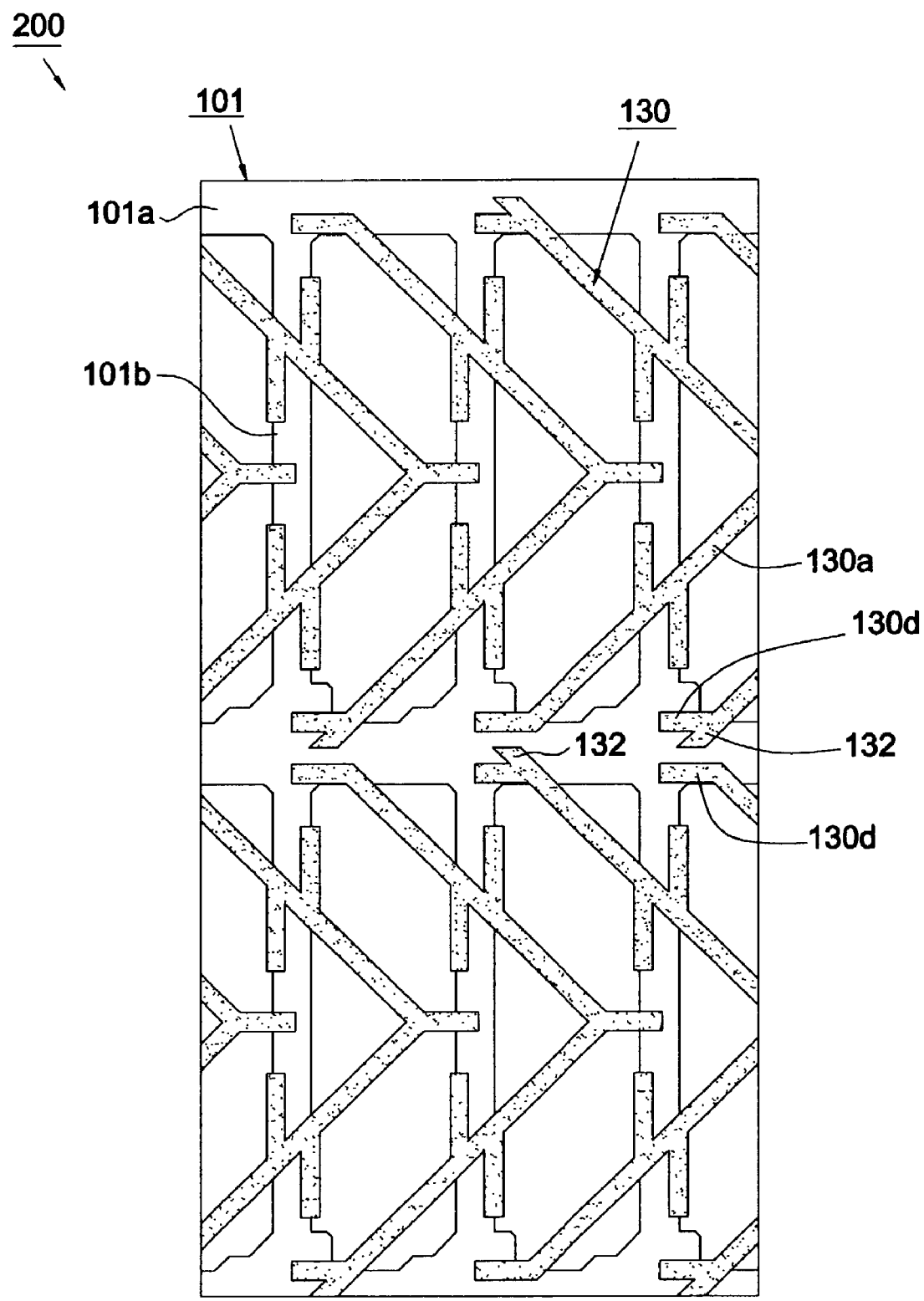
FIG. 2 is a plan view of a portion of an MVA LCD showing specific protrusion pattern according to a second embodiment of the present invention.

FIG. 2 shows the pixel region of an MVA LCD 200 according to a second embodiment of the present invention wherein the pixel electrodes 120 and the slits 140 are not shown. This LCD 200 includes a plurality of protrusions 132 formed inside one channel defined by two first branches 130d extending from the main bodies 130a of adjacent protrusions 130 and the substrates 102, 104 (not shown). During the step of pressing the substrates in the ODF process, the protrusions 132 slow down the flow rate of the dropped liquid crystal material through the aformentioned channel defined by the first branches 130d.

Figure 3:
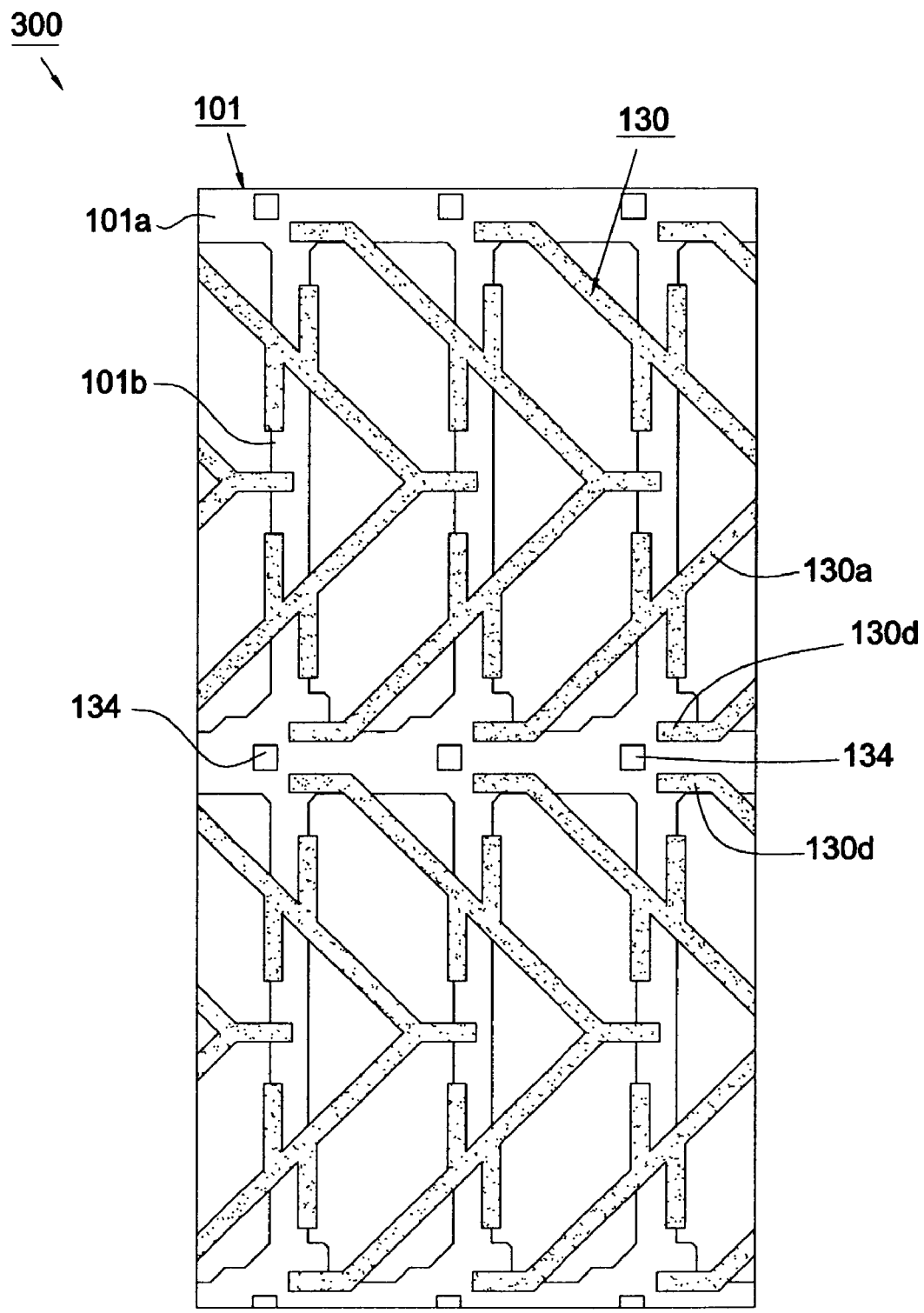
FIG. 3 is a plan view of a portion of an MVA LCD showing specific protrusion pattern according to a third embodiment of the present invention.

FIG. 3 shows the pixel region of an MVA LCD 300 according to a third embodiment of the present invention wherein the pixel electrodes 120 and the slits 140 are not shown. This LCD 300 includes a plurality of protrusions 134 formed at a location close to the left opening of the aformentioned channel. During the step of pressing the substrates in the ODF process, the protrusions 134 slow down the flow rate of the dropped liquid crystal material through the aformentioned channel.

Figure 4:
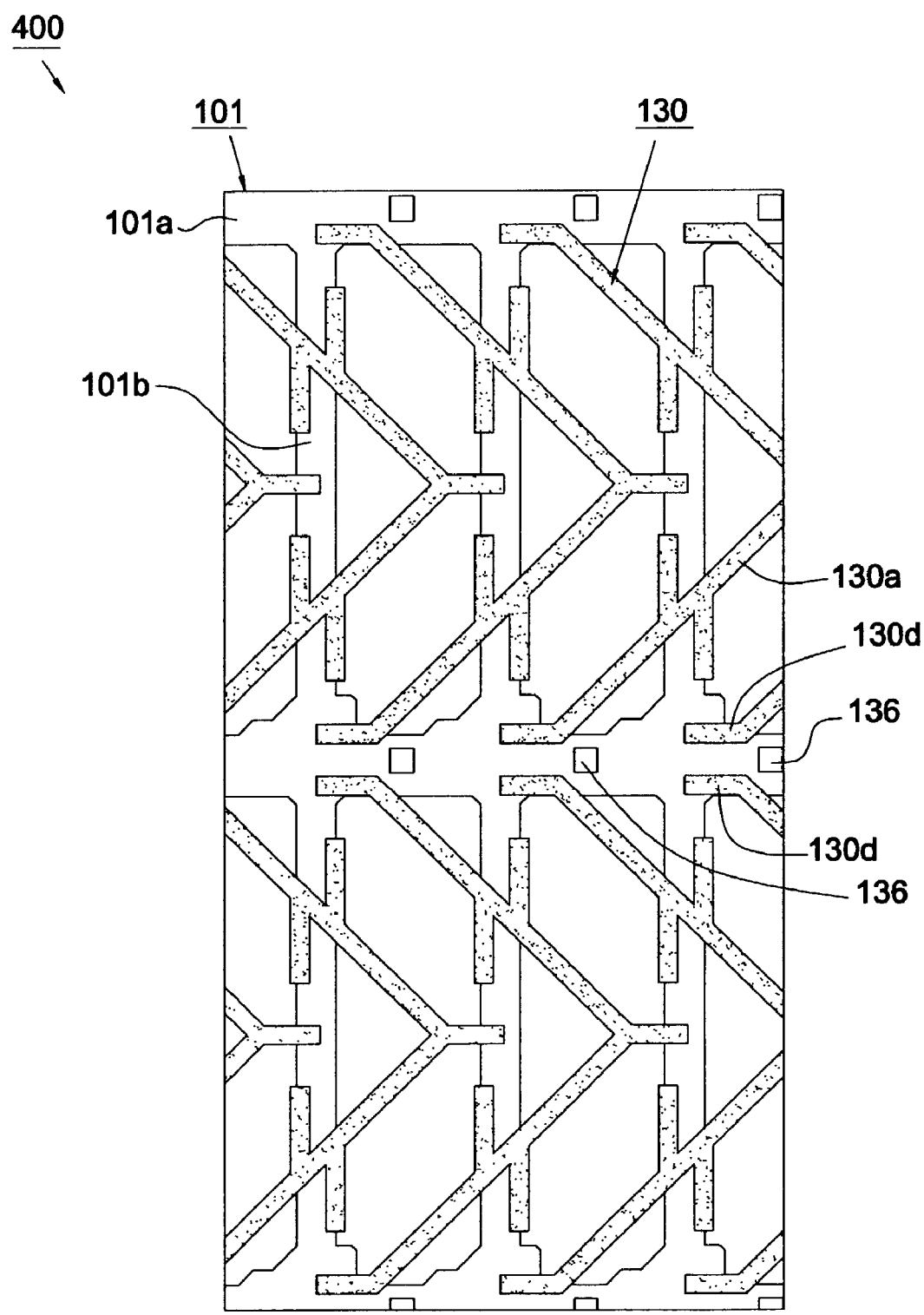
FIG. 4 is a plan view of a portion of an MVA LCD showing specific protrusion pattern according to a fourth embodiment of the present invention.

FIG. 4 shows the pixel region of an MVA LCD 400 according to a fourth embodiment of the present invention wherein the pixel electrodes 120 and the slits 140 are not shown. This LCD 400 includes a plurality of protrusions 136 formed at a location close to the right opening of the aformentioned channel. During the step of pressing the substrates in the ODF process, the protrusions 136 slow down the flow rate of the dropped liquid crystal material through the aformentioned channel.

Next, the process for forming the aformentioned protrusions will be described as follows. A photoresist is coated on the surface thereof, transferred a predetermined pattern (referring to the protrusion pattern shown in FIGS. 1–5), and then developed to form the protrusions 130, 132, 134, 136. This process is easily carried out by using conventional techniques. Additionally, the slits 140 can be formed simultaneously with the pixel electrodes 120 by utilizing conventional process.

Although the invention has been explained in relation to its preferred embodiment, it is to be understood that many other possible modifications and variations can be made without departing from the spirit and scope of the invention as hereinafter claimed.

What is claimed is:

1. A liquid crystal display, comprising:
   a first substrate and a second substrate processed for vertical alignment;
   a liquid crystal layer being sandwiched between the first and second substrates, the liquid crystal layer including liquid crystal molecules aligning in a direction substantially perpendicular to a principal surface of said first substrate when no substantial electric field is applied to said liquid crystal layer;
   a plurality of parallel gate lines and a plurality of parallel data lines perpendicular to the gate lines provided on the first substrate;
   a plurality of pixel electrodes provided on the first substrate, each pixel electrode having first edges parallel to the gate lines and second edges parallel to the data lines;
   a light-shielding matrix provided on the second substrate;
   an array of first protrusions disposed on the second substrate, each of the first protrusions having a main body being arranged substantially in a broken zigzag pattern, the broken zigzag pattern being broken by a plurality of breaks all formed within the area of the light-shielding matrix, wherein the first protrusions have a plurality of first branches formed at positions facing the first edges of the pixel electrodes and a plurality of second branches formed at positions facing the second edges of the pixel electrodes, a plurality of channels each being defined as a space between two adjacent first branches of one of the first protrusions; and
   a plurality of second protrusions provided on the second substrate, each of the second protrusions being formed at a location close to one of the channels.

2. The liquid crystal display as claimed in claim 1, wherein the first substrate comprises an array of slits provided on the pixel electrodes;
   the main bodies of the first protrusions are arranged substantially in parallel to one another; and
   the slits and the main bodies of the first protrusions are arranged alternately.

3. The liquid crystal display as claimed in claim 1, wherein:
   the light-shielding matrix has a plurality of columns extending along the data lines and a plurality of rows extending along the gate lines, and
   wherein none of the main bodies of the first protrusions extends across the rows of the light-shielding matrix.

4. The liquid crystal display as claimed in claim 1, wherein:
   the light-shielding matrix has a plurality of columns extending along the data lines and a plurality of rows extending along the gate lines, and
   wherein none of the main bodies of the first protrusions extends across the columns of the light-shielding matrix.

5. The liquid crystal display as claimed in claim 1, wherein:
   the light-shielding matrix has a plurality of columns extending along the data lines and a plurality of rows extending along the gate lines, and
   wherein none of the main bodies of the first protrusions extends across the columns and the rows of the light-shielding matrix.

6. The liquid crystal display as claimed in claim 1, wherein plurality of second protrusions are formed inside the channels.

7. The liquid crystal display as claimed in claim 1, wherein the one of first and second substrates further comprises a plurality of color layers.

8. The liquid crystal display as claimed in claim 1, wherein the one of first and second substrates further comprises a plurality of thin film transistor.

9. The liquid crystal display as claimed in claim 1, wherein the array of first protrusion are provided on the second substrate for regulating orientation of the liquid crystal layer such that the liquid crystal molecules are aligned obliquely when a voltage is applied so that the orientation will include a plurality of directions.

10. A liquid crystal display, comprising:
   a first substrate and a second substrate processed for vertical alignment;
   a liquid crystal layer sandwiched between the first and second substrates, the liquid crystal layer including liquid crystal molecules aligning in a direction substantially perpendicular to a principal surface of said first substrate when no substantial electric field is applied to said liquid crystal layer;
   a plurality of parallel gate lines and a plurality of parallel data lines perpendicular to the gate lines provided on the first substrate,
   a plurality of pixel electrodes provided on the first substrate, each pixel electrode having first edges parallel to the gate lines and second edges parallel to the data lines,
   an array of first protrusions and a light-shielding matrix disposed on the second substrate, each of the first protrusions having a main body being arranged substantially in a broken zigzag pattern, the broken zigzag pattern being broken by a plurality of breaks all formed within the area of the light-shielding matrix, wherein the first protrusions have a plurality of first branches formed at positions facing the first edges of the pixel electrodes and a plurality of second branches formed at positions facing the second edges of the pixel electrodes, a plurality of channels each being defined as a space between two adjacent first branches of one of the first protrusions, and
   a plurality of second protrusions provided on the second substrate, each of the second protrusions being formed at a location close to one of the channels.

11. The liquid crystal display as claimed in claim 10, wherein the first substrate comprises an array of slits provided on the pixel electrodes;
   the main bodies of the first protrusions are arranged substantially in parallel to one another; and
   the slits and the main bodies of the first protrusions are arranged alternately.

12. The liquid crystal display as claimed in claim 10, wherein:
   the light-shielding matrix has a plurality of columns extending along the data lines and a plurality of rows extending along the gate lines, and
   wherein none of the main bodies of the first protrusions extends across the rows of the light-shielding matrix.

13. The liquid crystal display as claimed in claim 10, wherein:
   the light-shielding matrix has a plurality of columns extending along the data lines and a plurality of rows extending along the gate lines, and
   wherein none of the main bodies of the first protrusions extends across the columns of the light-shielding matrix.

14. The liquid crystal display as claimed in claim 10, wherein:
   the light-shielding matrix has a plurality of columns extending along the data lines and a plurality of rows extending along the gate lines, and
   wherein none of the main bodies of the first protrusions extends across the columns and the rows of the light-shielding matrix.

15. The liquid crystal display as claimed in claim 10, wherein the plurality of second protrusions are formed inside the channels.

* * * * *